United States Patent
Maruyama

(10) Patent No.: US 6,246,944 B1
(45) Date of Patent: Jun. 12, 2001

(54) APPARATUS FOR CONTROLLING BRAKE OF VEHICLE

(75) Inventor: Ryoichi Maruyama, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/117,355

(22) PCT Filed: Jan. 22, 1997

(86) PCT No.: PCT/JP97/00122

§ 371 Date: Jul. 28, 1998

§ 102(e) Date: Jul. 28, 1998

(87) PCT Pub. No.: WO97/28030

PCT Pub. Date: Aug. 7, 1997

(30) Foreign Application Priority Data

Jan. 29, 1996 (JP) .................................................. 8-013000

(51) Int. Cl.$^7$ .............................. G06F 7/70; G06F 19/00
(52) U.S. Cl. .............................. 701/70; 701/78; 701/83; 303/167; 477/71; 477/205
(58) Field of Search ............................... 701/70, 78, 79, 701/83, 90; 303/121, 167, 171; 477/24, 71, 203, 205; 73/132

(56) References Cited

U.S. PATENT DOCUMENTS

| 3,662,593 | * | 5/1972 | Pirrello et al. ............... 73/132 |
| 5,287,773 | * | 2/1994 | Nakawaki et al. ............ 477/92 |
| 5,320,422 | * | 6/1994 | Tsuyama et al. ............. 303/141 |
| 5,439,429 | * | 8/1995 | Lee ........................... 477/207 |
| 5,660,448 | * | 8/1997 | Kiesewetter et al. . |

* cited by examiner

Primary Examiner—William A. Cuchlinski, Jr.
Assistant Examiner—Gertrude Arthur
(74) Attorney, Agent, or Firm—Diller, Ramik & Wight

(57) ABSTRACT

An apparatus for controlling the brake of a vehicle, which easily brings the vehicle to a halt, or starts it, only by the action of the accelerator without operating the brake pedal. Brakes (4,5) are applied when the vehicle speed detected by a speed detector (9) becomes a predetermined threshold value or less. The operation of the brakes (4,5) is turned off when a load detected by a load detector (10) becomes larger than a load operated by a load computer (11,14).

7 Claims, 9 Drawing Sheets

APPARATUS FOR CONTROLLING BRAKE OF VEHICLE

TECHNICAL FIELD

The present invention relates to an apparatus for controlling a brake of vehicle which by virtue of automatic control of the on-and-off action of the brake serves to relieve the onus on the operator in stopping and starting the vehicle by compound operation of the accelerator and brake pedals.

BACKGROUND ART

Stopping and starting a vehicle by manual operation of the accelerator and brake pedals involves subtle handling of these pedals (and also of the clutch pedal), and requires the brake pedal to be depressed constantly while the vehicle is at a standstill. It thus demands a fair degree of experience on the part of the operator, while the onus on him is great. This is particularly true when stopping and starting on a hill.

For this reason there has long been a demand to facilitate the stopping and starting of a vehicle by means of a simple operation which places as little onus as possible on the operator.

Japanese Patent Application Laid-Open No. 59-143746 proposes holding or releasing braking force by means of controlling an electrically operated parking brake device.

In other words, according to the abovementioned invention, if with vehicular speed at zero the accelerator pedal is released and the brake pedal depressed, the parking brake device operates and stops the vehicle automatically.

This means that if, for instance, an attempt was made to exert subtle control over the vehicle by operating only the accelerator pedal with a view to maintaining a safe distance from a vehicle in front on a steep upward slope, it might in the end become necessary to depress the brake pedal, and the vehicle would sometimes begin to move backwards before this operation was effected.

Moreover, in the abovementioned invention, the engine rotational speed at which it is possible to obtain the output necessary to ensure that the vehicle does not roll backwards on a slope is set in accordance with the gradient of the slope, so that the parking brake is released and the vehicle allowed to move forward once the engine attains a speed corresponding to the gradient of the slope as detected by a gradient sensor.

It is true that in vehicles which employ torque converters the tractive force is more or less determined by the engine rotational speed and the speed stage, and that releasing the brake when the engine has attained a speed corresponding to the current gradient does not create any problem because the necessary tractive force can be obtained. However, in vehicles which employ direct transmission the tractive force is determined by the transmission torque of the main clutch, and not by the engine rotational speed. Moreover, much the same applies also to vehicles which employ other types of transmission and to vehicles driven by electricity, where again the tractive force is not determined on the basis of the engine rotational speed.

Accordingly, in vehicles of this sort it does not follow that the required tractive force can always be obtained even if the engine has attained a speed corresponding to the current gradient when the brake is released.

For this reason there has been a tendency for the tractive force on brake release either to be insufficient, so that the vehicle begins to roll backwards, or to be too great, with the result that the tires slip.

Japanese Patent Application Laid-Open No. 61-200054 similarly proposes a technique for holding or releasing braking force by means of controlling the hydraulic brakes.

That is to say, according to the abovementioned invention, when the gradient (inclined angle) of the vehicle is at a given standard value or more, the foot-brake is applied and the vehicle speed is zero, a cylinder pressure becomes greater than a brake-holding pressure corresponding to the gradient. When the hydraulic pressure falls again and matches the holding pressure, a control valve closes, brake pressure is held, and the brake operates.

In this manner, the fact that the abovementioned invention presupposes that "applying the foot-brake" is an automatic braking action means that as in the case of Japanese Patent Application Laid-Open No. 59-143746 there has been a tendency for the vehicle to begin rolling backwards before the brake pedal is finally depressed.

Moreover, in the abovementioned invention the control valve and brake are released when the degree of opening of the accelerator is greater than a given standard value and the clutch switch is on. Thus, inasmuch as it does not assess whether or not the tractive force corresponds to the current gradient of the road, there has been a tendency on steep gradients for vehicles to begin rolling backwards as soon as the brake is released.

DISCLOSURE OF THE INVENTION

It is a first object of the present invention, which has been designed with these circumstances in mind, to allow a vehicle to be brought to a halt in a simple manner by depressing only the accelerator and without depressing the brake pedal, and to ensure that this is accomplished without the inconvenience of the vehicle beginning to roll backwards.

It is a second object of the present invention to ensure that it is possible to start the vehicle on a slope without any difficulty and with a tractive force corresponding to the gradient irrespective of the type of transmission, and even when applied to vehicles of types other than those which are driven by an engine.

In order to accomplish the first object, a principal aspect of the present invention is an apparatus for controlling a brake of a vehicle having an accelerator pedal and a brake pedal, comprising:

traveling speed detecting means for detecting a travelling speed of the vehicle; and control means for controlling to actuate the brake when the travelling speed detected by the travelling speed detecting means becomes a prescribed threshold value or lower.

In this manner, the brakes are applied automatically by virtue of the fact that the speed of the vehicle has fallen below a certain value, thus allowing the vehicle to be brought to a halt in a simple manner by depressing only the accelerator and without depressing the brake pedal, and to ensure that this is accomplished without the inconvenience of the vehicle beginning to roll backwards.

Meanwhile, in order to accomplish the second object, another principal aspect of the present invention is an apparatus for controlling a brake of a vehicle having an accelerator pedal and a brake pedal wherein the brake is automatically actuated and thereafter turned off, comprising:

acceleration detecting means for detecting an acceleration of the vehicle in a forward and backward direction;

load calculating means for calculating, on the basis of the acceleration detected by the acceleration detecting means, a load on an output shaft while the brake is not applied;

load detecting means for detecting the load on the output shaft; and control means for controlling to turn off the brake when the load detected by the load detecting means becomes greater than the load calculated by the load calculating means.

In this manner, the brakes are automatically released if the current load becomes greater than the one which corresponds to the acceleration of the vehicle in a forward and backward direction, thus making it possible to start the vehicle on a slope without any difficulty and with a tractive force corresponding to the gradient irrespective of the type of transmission, and even when applied to vehicle of types other than those which are driven by an engine.

BEST MODE FOR CARRYING OUT THE INVENTION

There follow, with reference to the drawings, descriptions of several embodiments of the apparatus for controlling vehicle brakes to which the present invention pertains.

Figure 1:
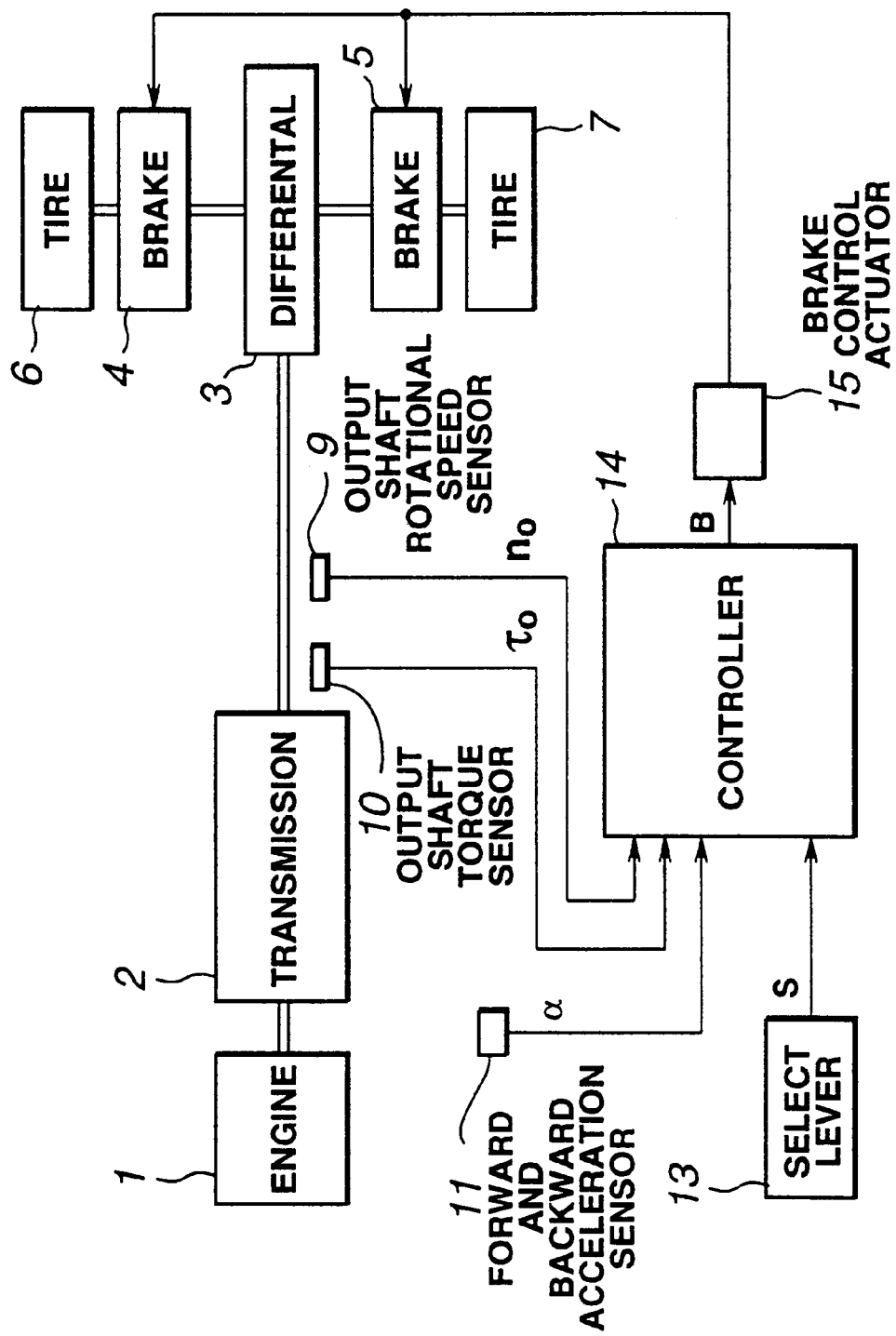
FIG. 1 is a block diagram illustrating an example of an embodiment of the apparatus for controlling a brake of a vehicle to which the present invention pertains.

FIG. 1 is a block diagram illustrating the configuration of a vehicle to which the present invention is applied.

As is depicted in FIG. 1, this vehicle runs with an engine 1 as its source of driving power, and the configuration is such that the driving power of the engine 1 is transmitted by way of a transmission 2 and a differential 3 to left and right tires 6, 7.

On the output shaft of the transmission 2 is located an output shaft rotational speed sensor 9 which detects the rotational speed nO of the output shaft. The detection signal nO of this sensor 9 is output to a controller 14.

Similarly, on the output shaft of the transmission 2 is located an output shaft torque sensor 10 which detects the torque $\tau O$ of the output shaft. The detection signal $\tau O$ of this sensor 10 is output to the controller 14.

In a suitable position on the body of the vehicle is also located a forward and backward acceleration sensor 11 which serves to detect acceleration a of the vehicle in a forward and backward direction. The detection signal $\alpha$ of this sensor 11 is output to the controller 14.

A select lever is provided within the cab of the vehicle, by operating which it is possible to designate and select forward, reverse and neutral. This select lever has a select lever displacement sensor 13 which detects the selected position s. The detection signal s of this sensor 13 is output to the controller 14.

The engine 1 of this vehicle is driven by operating an accelerator pedal (not depicted in the drawing) which is located within the cab, and in a similar fashion the brakes 4, 5 are operated by depressing a brake pedal (not depicted in the drawing) which is also located within the cab.

The brakes 4,5 are controlled automatically by the controller 14 and a brake control actuator 15.

In other words, the output signals nO, $\tau O$, $\alpha$, s from each of the abovementioned sensors are input into the controller 14. Here, calculations and processing as described later are effected, as a result of which a brake control signal B is output to the brake control actuator 15.

The brake control actuator 15 feeds on/off control hydraulic pressure in accordance with the content of the input brake control signal B to the brakes 4,5 which are located on the left and right wheels. As a consequence, the brakes 4,5 are applied or released in accordance with the on/off control hydraulic pressure.

Figure 2:
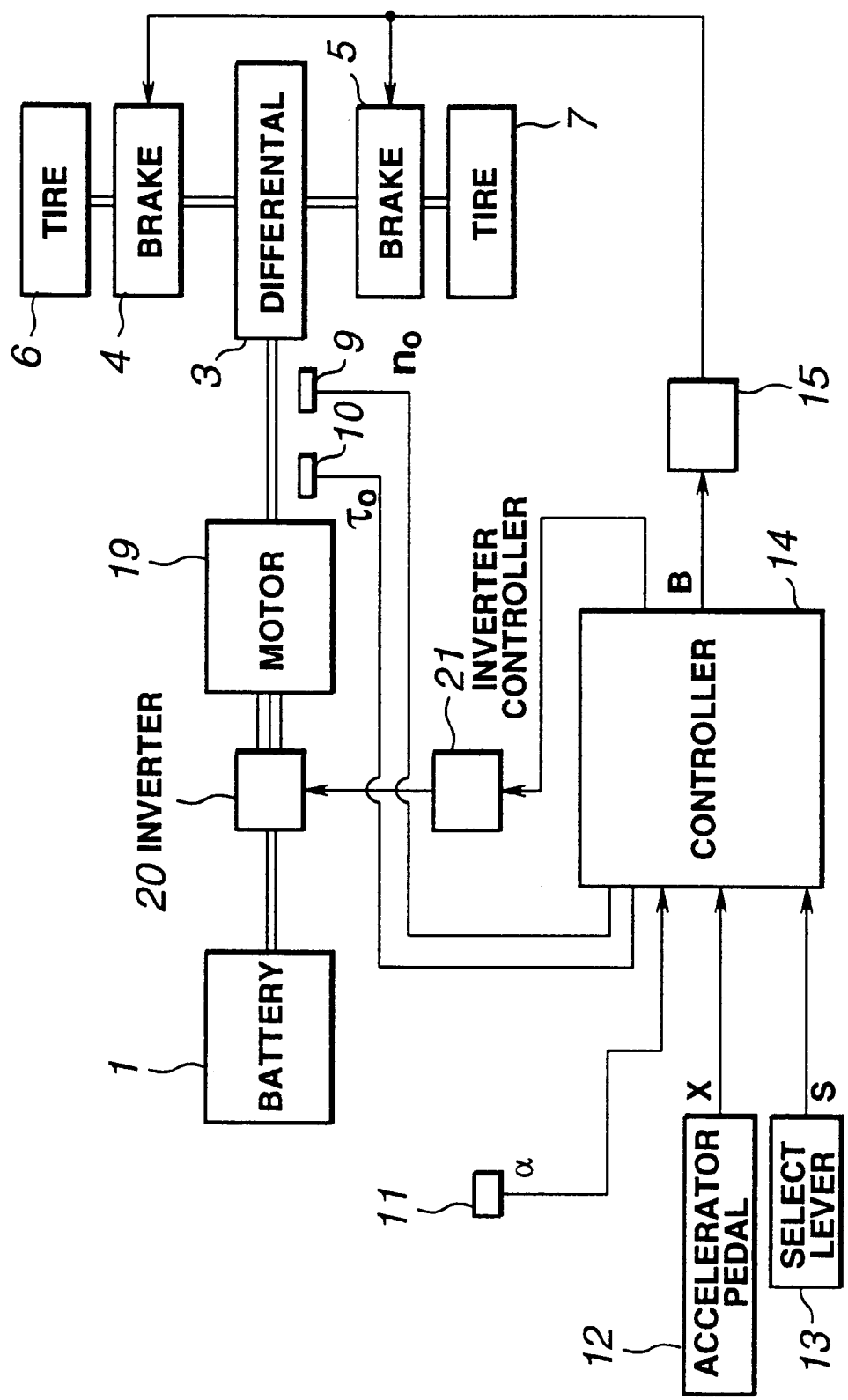
FIG. 2 is a block diagram illustrating an example of an embodiment of the apparatus for controlling a brake of a vehicle to which the present invention pertains.

The configuration of the vehicle in which the present invention is adopted may also be that which is depicted in FIG. 2.

As may be seen from FIG. 2, this vehicle is driven by means of a motor 19 with a battery 1' as a source of power, and the driving power of the motor 19 is transmitted by way of the differential 3 to the left and right tires 6, 7.

Those codes which are the same as those used in FIG. 1 refer to the same structural elements, and their descriptions will not be repeated here. It should be noted that the output shaft rotational speed sensor 9 and the output shaft torque sensor 10 are located on the output shaft of the motor 19.

In this vehicle, the motor 19 is driven by operating an accelerator pedal which is located within the cab, while a brake pedal also located within the cab serves to apply the brakes 4, 5.

On the accelerator pedal is located an accelerator pedal displacement sensor 12 which detects changes in the displacement x of the accelerator pedal, the detection signal x being output to the controller 14.

The brakes 4, 5 are controlled automatically by the controller 14 and the brake control actuator 15, as in FIG. 1.

That is to say, the output signals nO, $\tau$, $\alpha$, s, x from the abovementioned sensors are input to the controller 14, where calculations and processing as described later are effected, as a result of which a brake control signal B is output to the brake control actuator 15.

The calculations and processing which are effected by the controller 14 allow the target rotational speed NO of the motor output shaft to be determined, and this target rotational speed NO is output to an inverter controller 21.

In this manner, not only are the brakes 4, 5 applied or released automatically in response to the brake control signal B output from the controller 14, but the inverter 20 is controlled in accordance with the target rotational speed NO which is also output from the controller 14. In other words, a control signal corresponding to the target rotational speed NO input to the inverter controller 21 is output to the inverter 20, and the inverter 20 modifies the drive voltage frequency of the motor 19 in response to this control signal, matching the rotational speed of the output shaft of the motor 19 to the target rotational speed NO.

Figure 3:
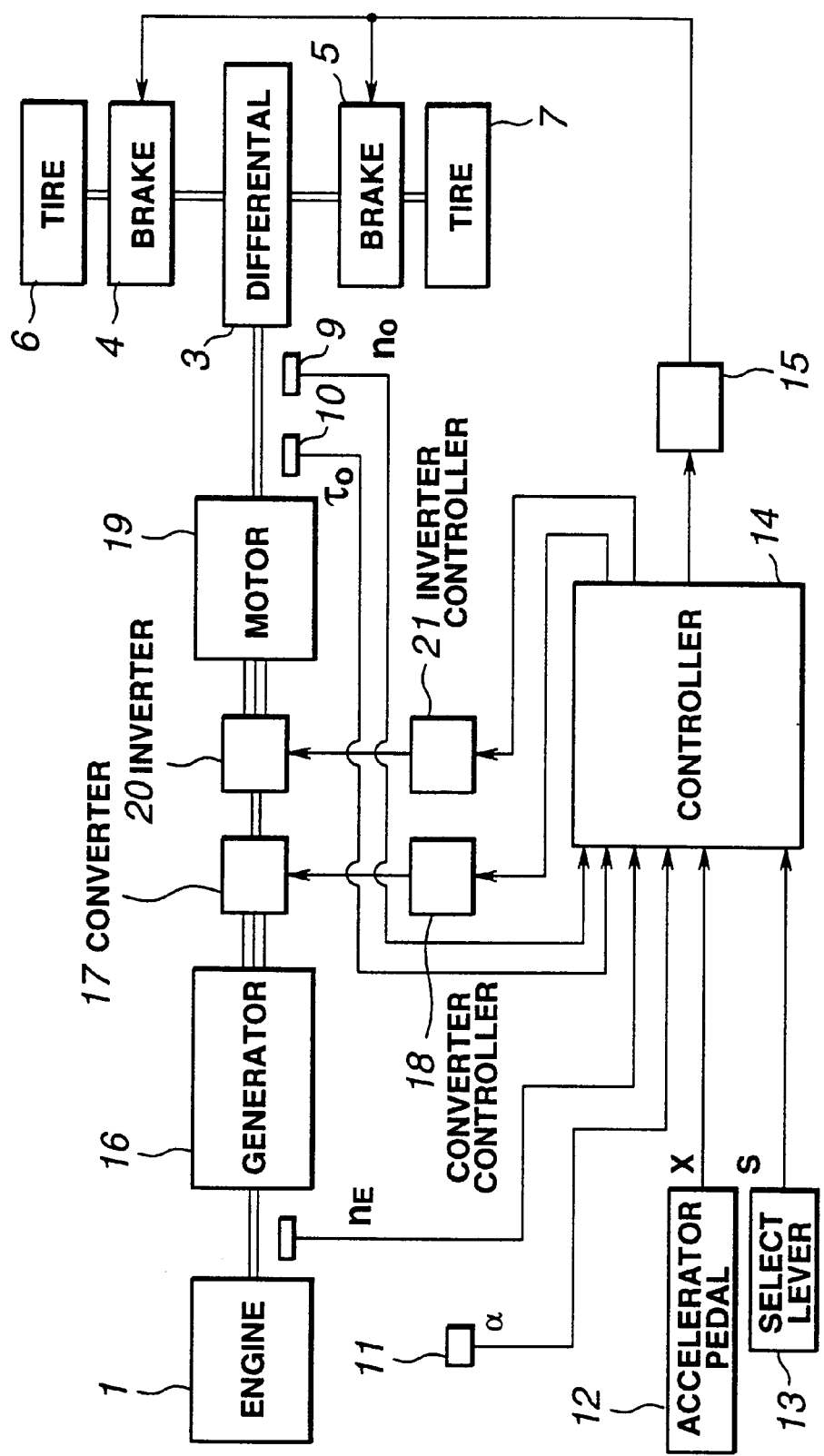
FIG. 3 is a block diagram illustrating an example of an embodiment of the apparatus for controlling a brake of a vehicle to which the present invention pertains.

The configuration of the vehicle in which the present invention is adopted may also be that which is depicted in FIG. 3.

As may be seen from FIG. 3, this vehicle is driven by means of a motor 19 with a generator 16 driven by the engine 1 as a source of power, and the driving power of the motor 19 is transmitted by way of the differential 3 to the left and right tires 6, 7.

Those codes which are the same as those used in FIGS. 1 and 2 refer to the same structural elements, and their descriptions will not be repeated here. It should be noted that the output shaft rotational speed sensor 9 and the output shaft torque sensor 10 are located on the output shaft of the motor 19.

In addition, the output shaft of the engine 1 has located on it an engine rotational speed sensor 8 which detects the rotational speed nE of that shaft, the detection signal nE of this sensor 8 being output to the controller 14.

In this vehicle, the motor 19 is driven by operating an accelerator pedal which is located within the cab, while a brake pedal also located within the cab serves to apply the brakes 4, 5.

Moreover, the brakes 4, 5 are controlled automatically by the controller 14 and the brake control actuator 15, as in FIGS. 1 and 2.

That is to say, the output signals nO, τ, α, s, x, nE from the abovementioned sensors are input to the controller 14, where calculations and processing as described later are effected, as a result of which a brake control signal B is output to the brake control actuator 15.

The calculations and processing which are effected by the controller 14 allow the target rotational speed NO of the motor output shaft to be determined, and this target rotational speed NO is output to an inverter controller 21.

In addition, the calculations and processing which are effected by the controller 14 allow the target rotational speed NE of the engine output shaft to be determined, and this target rotational speed NE is output to a converter controller 18.

In this manner, not only are the brakes 4, 5 applied or released automatically in response to the brake control signal B output from the controller 14, but the inverter 20 is controlled in accordance with the target rotational speed NO which is also output from the controller 14, while the converter 17 is controlled in accordance with the target rotational speed NE which is again output from the controller 14. In other words, a control signal corresponding to the target rotational speed NE input to the converter controller 18 is output to the converter 17, and in response to this control signal the converter 17 adjusts the electric power supplied from the generator 16 and drives the generator 16 as a motor, matching the rotational speed of the output shaft of the engine 1 to the target rotational speed NE.

It should be added that the abovementioned vehicle is assumed to be one wherein two drive wheels are located left and right, as in a four-wheeled vehicle, but the present invention may also be applied to a one-wheel drive vehicle such as a motor-cycle. It goes without saying that it is not restricted to a vehicle which runs on wheels, and may also be applied to one which runs on crawler tracks.

Moreover, the output shaft rotational speed sensor 9 is used to detect the speed of the vehicle against the ground, and in particular low speeds, and it may be replaced with a sensor which is capable of detecting speeds other than the rotational speed nO of the output shaft.

Similarly, the output shaft torque sensor 10 is used to detect the tractive force of the vehicle, and it may be replaced with a sensor which is capable of detecting torque other than the torque τO of the output shaft. For instance, where the wheels are driven by the motor, the torque of the motor is proportional to the current supplied, so that a sensor which detects this current can be used to detect tractive force.

The forward and backward acceleration sensor 11 is used in order to detect the external force (gravity) to which the body of the vehicle in subjected in a forward and backward direction, and it can be replaced by a sensor which is capable of detecting external force other than forward and backward acceleration α

What is more, in FIGS. 1–3 manual and automatic brakes form the common brakes 4, 5, but they may also be provided separately.

Figure 4:
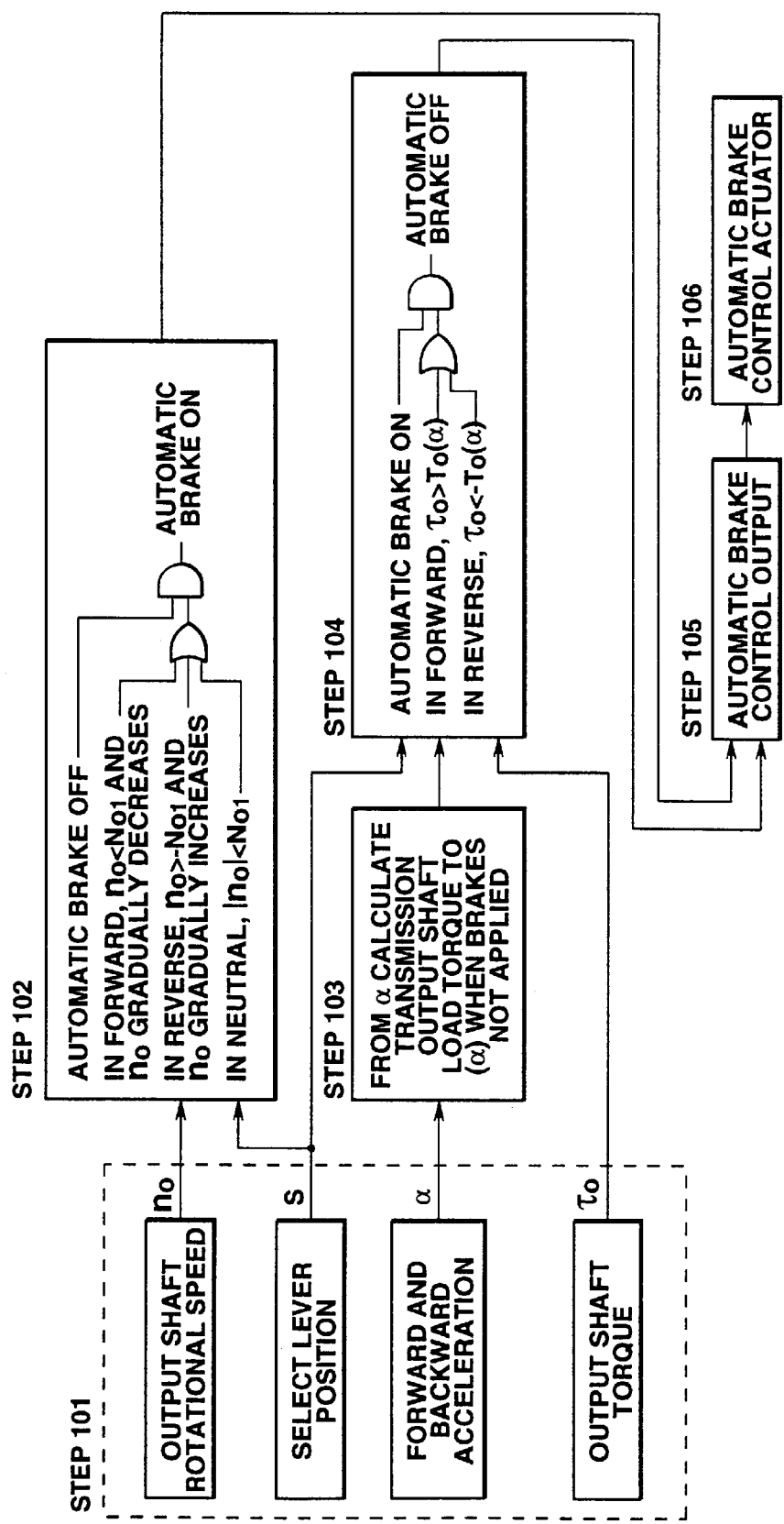
FIG. 4 is a control block diagram clarifying details of the control adopted in the apparatus illustrated in FIGS. 1–3.

There now follows, with reference to FIG. 4, a description of the calculations and processing which are effected by the controller 14 illustrated in FIGS. 1–3.

In the explanation which follows, the rotational speed nO of the output shaft assumes a positive value in forward, and a negative value in reverse. In the same way, the torque τO of the output shaft assumes a positive value in forward, and a negative value in reverse.

As may be seen from FIG. 4, to begin with, data from the abovementioned sensors 9, 10, 11, 13 (ie rotational speed no and torque τO of the output shaft, forward and backward acceleration α, selected position s of the select lever) is introduced item by item into the controller 14 (Step 101).

If it is here assumed that the vehicle is ascending a slope and stops in the course of the slope, the operator releases the accelerator pedal and applies the brake (depresses the brake pedal) in order to stop the vehicle.

Here, if the vehicle is in forward mode, that is, if the selected position s of the select lever is "forward", while the content of the brake control signal B is "off", the output shaft speed nO is lower than the prescribed threshold value NO1 and gradually decreasing, it is judged that the vehicle may be about to stop, and a brake control signal B with the content "on" is generated (Step 102). This is output from the controller 14 to the brake control actuator 15 (Step 105), and the brakes 4, 5 are applied automatically (Step 106). As a result, the operator is able to bring the vehicle to a halt on a slope by means of the simple operation of releasing the accelerator, although in order to decrease the speed of the vehicle the operator must depress the brake pedal until moments before the vehicle comes to a standstill. Moreover, the vehicle can be kept at a standstill thereafter without the need to continue depressing the brake pedal.

In Step 102 above, "when the output shaft speed nO is gradually decreasing" refers to a state wherein, "the rotational speed nO as detected by the output shaft rotational speed sensor 9 is lower than the previously detected rotational speed n'O". If this state is confirmed as a result of at least two detections, it can be judged that the operator has released the accelerator with the intention of bringing the vehicle to a halt.

The abovementioned prescribed threshold value NO1 is preferably a very low speed close to zero (eg 1 km/h or less).

Meanwhile, if the vehicle is in reverse mode, ie if the selected position s of the select lever is "reverse", the conditions under which the content of the brake control signal changes to "on" are the same as those which apply to forward mode, except for differences resulting from the fact that the rotational speed nO of the output shaft assumes a negative value (Step 102).

Furthermore, if the vehicle is in neutral mode, ie if the selected position s of the select lever is "neutral", while the content of the brake control signal B is "off" and the absolute value of the output shaft speed nO is lower than the threshold value NO1, a brake control signal B with the content "on" is generated (Step 102). This is output from the controller 14 to the brake control actuator 15 (Step 105), and the brakes 4, 5 are applied automatically (Step 106).

Next, if it is assumed that the vehicle is about to start on a slope, the operator depresses the accelerator pedal in order to start the vehicle.

What happens then is that the load torque $\tau O(\alpha)$ on the output shaft when the brakes are not applied is calculated on the basis of the acceleration $\alpha$ as detected by the forward and backward acceleration sensor 11 (Step 103).

The abovementioned load torque $O(\alpha)$ is the torque which the output shaft receives from the brake side, and is positive where the vehicle is starting in an uphill direction.

Meanwhile, the current torque $\tau O$ on the output shaft is obtained as the output of the output shaft torque sensor 10. Here, the load torque $\tau O$ signifies the torque which the output shaft receives as counterforce from the brake side when the driving power is transmitted to the brakes. It is positive where the vehicle is driven in forward mode.

Now, if these torques $TO(\alpha)$, $\tau O$ are compared, and in forward mode the content of the brake control signal B is "on", while the output shaft torque $\tau O$ is greater than the load torque $TO(\alpha)$ corresponding to the abovementioned acceleration, it is judged the brakes can be released in order for the vehicle to start, whereupon a brake control signal B with the content "off" is generated (Step 104). This is output from the controller 14 to the brake control actuator 15 (Step 105), and the brakes 4, 5 are released automatically (Step 106). As a result, the operator is able to start the vehicle with sufficient tractive force for the gradient of the slope by means of the simple operation of depressing the accelerator.

Meanwhile, if the vehicle is in reverse mode, the conditions under which the content of the brake control signal changes to "off" are the same as those which apply to forward mode, except for differences resulting from the fact that the codes for the torque $\tau O$, $TO(\alpha)$ are reversed (Step 103).

Figure 5:
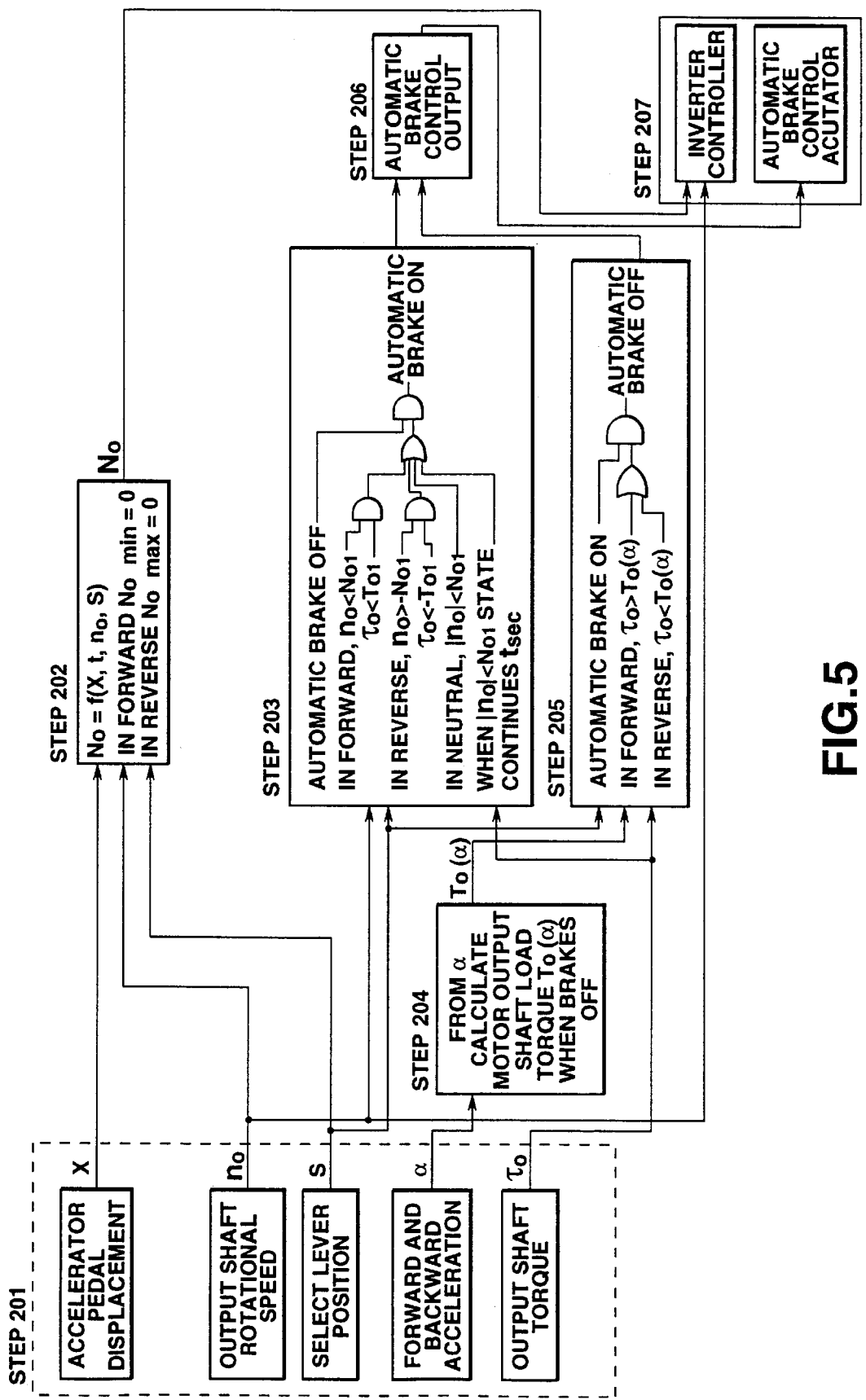
FIG. 5 is a control block diagram clarifying details of the control which is suitable for the apparatus illustrated in FIG. 2.

There now follows, with reference to the control block diagram in FIG. 5, a description of the most suitable processing for the vehicle illustrated in FIG. 2.

As may be seen from FIG. 5, to begin with, data from the abovementioned sensors 9, 10, 11, 13, 12 (ie rotational speed nO and torque $\tau O$ of the output shaft, forward and backward acceleration $\alpha$, selected position s of the select lever, changes in accelerator pedal displacement x) is introduced item by item into the controller 14 (Step 201).

Next, a function f with the current rotational speed nO of the output shaft, selected position s of the select lever, changes in accelerator pedal displacement x and time elapsed t as variables is used to calculate the target value NO=f (x, t, nO, s) of the rotational speed of the output shaft of the motor 19. This target value NO assumes a positive value in forward mode and a negative value in reverse mode. The minimum value NOmin in forward mode and the maximum value NOmax in reverse mode are 0.

The target rotational speed NO of the output shaft calculated in this manner is output to the inverter controller 21 (Step 202). As a result, the motor 19 is controlled via the inverter controller 21 in such a manner that the rotational speed of the motor 19 becomes the abovementioned target rotational speed NO. In this process the output nO of the output shaft rotational speed sensor 9 is used as the feedback amount (Step 207).

If it is here assumed that the vehicle is ascending a slope and stops in the course of the slope, the operator releases the accelerator pedal and applies the brake (depresses the brake pedal) in order to stop the vehicle.

Here, if the vehicle is in forward mode, ie if the selected position s of the select lever is "forward", while the content of the brake control signal B is "off", the output shaft speed nO is lower than the prescribed threshold value NO1, and the output shaft torque $\tau O$ is greater than the prescribed threshold value TO1, it is judged that the vehicle may be about to stop, and a brake control signal B with the content "on" is generated (Step 203). This is output from the controller 14 to the brake control actuator 15 (Step 206), and the brakes 4, 5 are applied automatically (Step 207). As a result, the operator is able to bring the vehicle to a halt on a slope by means of the simple operation of releasing the accelerator, although in order to decrease the speed of the vehicle the operator must depress the brake pedal until moments before the vehicle comes to a standstill. Moreover, the vehicle can be kept at a standstill thereafter without the need to continue depressing the brake pedal.

In Step 203 above, the reason for the condition that "the output shaft torque $\tau O$ is greater than the prescribed threshold value TO1" is as follows.

In the case of a vehicle which is driven by a motor, it is possible to stop on a slope while maintaining tractive force by making the target speed 0, and there is consequently no need to apply the brakes. However, if the slope is steep, the electric current flowing to the motor increases, with resultant loss of energy. In such circumstances the brakes are applied and the motor current reduced to 0 in order to reduce energy loss.

Meanwhile, if the vehicle is in reverse mode, ie if the selected position s of the select lever is "reverse", the conditions under which the content of the brake control signal changes to "on" are the same as those which apply to forward mode, except for differences resulting from the fact that the rotational speed nO and torque $\tau O$ of the output shaft assume negative values (Step 203).

Furthermore, if the vehicle is in neutral mode, that is, if the selected position s of the select lever is "neutral", while the content of the brake control signal B is "off" and the absolute value of the output shaft speed nO is lower than the threshold value NO1, a brake control signal B with the content "on" is generated (Step 203). This is output from the controller 14 to the brake control actuator 15 (Step 206), and the brakes 4, 5 are applied automatically (Step 207).

Furthermore, irrespective of the selected position s of the select lever, if a state wherein the absolute value of the target rotational speed NO of the output shaft is smaller than a prescribed threshold value NO2 lasts for more than a prescribed length of time t (sec), a brake control signal B with the content "on" is generated (Step 203). This is output from the controller 14 to the brake control actuator 15 (Step 206), and the brakes 4, 5 are applied automatically (Step 207).

Here, the reason for insisting that "the output shaft torque tO is greater than the prescribed threshold value TO2" as a condition for applying the brakes automatically is in order to reduce loss resulting from the motor drive current when the vehicle does not start within the prescribed time, since the tractive force of the engine is maintained during standstill.

Next, if it is assumed that the vehicle is about to start on a slope, the operator depresses the accelerator pedal in order to start the vehicle.

Then, the load torque TO($\alpha$) on the output shaft when the brakes are not applied is calculated on the basis of the acceleration $\alpha$ as detected by the forward and backward acceleration sensor 11 (Step 204).

Meanwhile, the current torque $\tau$O on the output shaft is obtained as the output of the output shaft torque sensor 10. If these torques TO($\alpha$), $\tau$O are compared, and in forward mode the content of the brake control signal B is "on", while the output shaft torque $\tau$O is greater than the load torque TO($\alpha$) corresponding to the abovementioned acceleration, it is judged the brakes can be released in order for the vehicle to start, whereupon a brake control signal B with the content "off" is generated (Step 205). This is output from the controller 14 to the brake control actuator 15 (Step 206), and the brakes 4, 5 are released automatically (Step 207). As a result, the operator is able to start the vehicle with sufficient tractive force for the gradient of the slope by means of the simple operation of depressing the accelerator.

Meanwhile, if the vehicle is in reverse mode, the conditions under which the content of the brake control signal changes to "off" are the same as those which apply to forward mode, except for differences resulting from the fact that the codes for the torque $\tau$O, TO($\alpha$) are reversed (Step 205).

Figure 6:
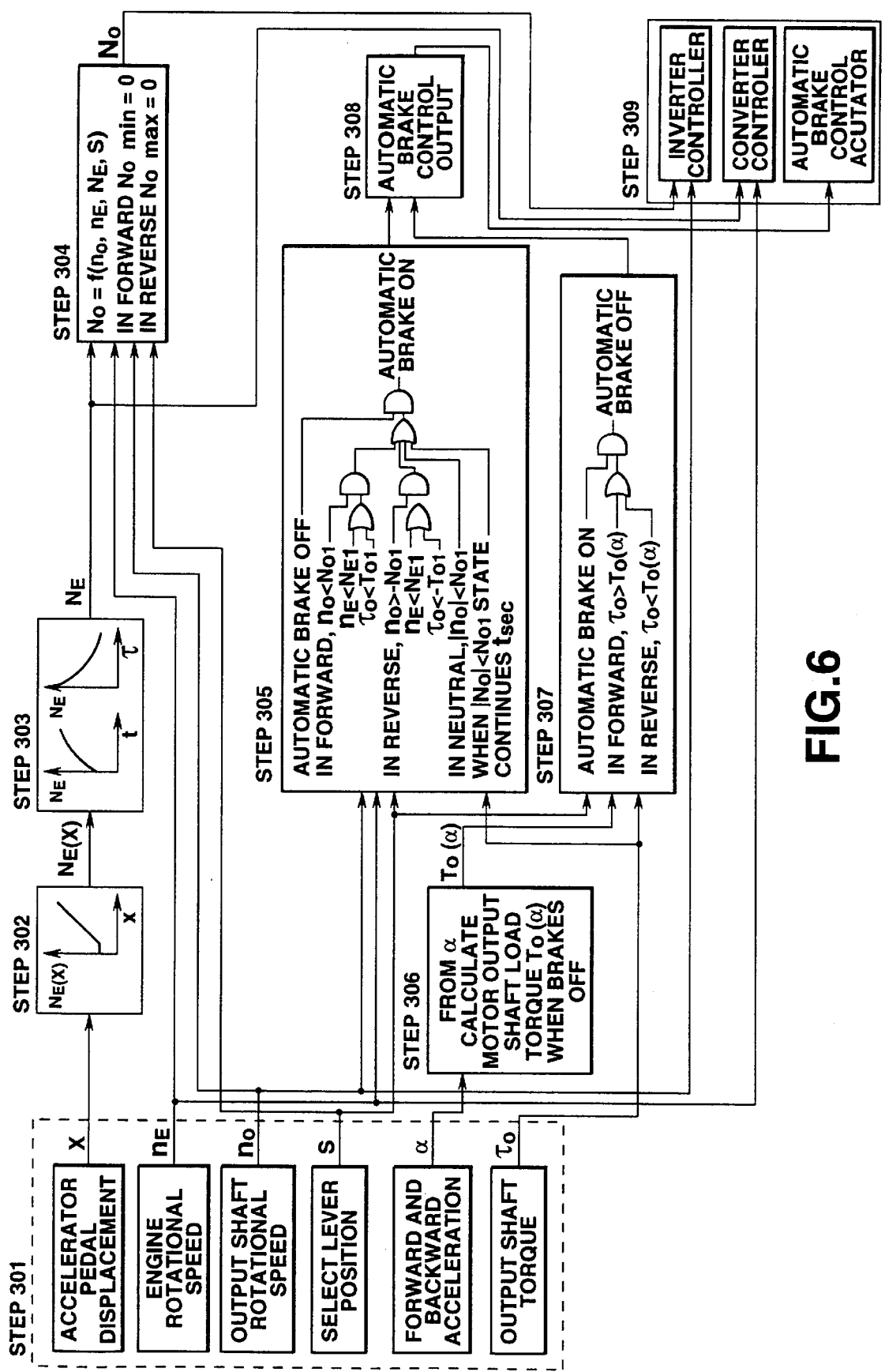
FIG. 6 is a control block diagram clarifying details of the control which is suitable for the apparatus illustrated in FIG. 3.

There now follows, with reference to the control block diagram in FIG. 6, a description of the most suitable processing for the vehicle illustrated in FIG. 3.

As may be seen from FIG. 6, to begin with, data from the abovementioned sensors 9, 10, 11, 13, 12, 8 (ie rotational speed nO and torque $\tau$O of the output shaft, forward and backward acceleration $\alpha$, selected position s of the select lever, changes in accelerator pedal displacement x, engine rotational speed nE) is introduced item by item into the controller 14 (Step 302).

Here, when the target engine rotational speed NE (x) is increasing, a maximum value is set for each time elapsed (t). If the target engine rotational speed NE (x) obtained in Step 302 is in excess of this maximum value, the maximum value is output, while if the target engine rotational speed NE (x) obtained in Step 302 is less than this maximum value, the target engine rotational speed NE (x) obtained in Step 302 is output without modification.

Meanwhile, when the target engine rotational speed NE (x) is decreasing, a minimum value is set for each time elapsed (t). If the target engine rotational speed NE (x) obtained in Step 302 is less than this minimum value, the minimum value is output, while if the target engine rotational speed NE (x) obtained in Step 302 is in excess of this minimum value, the target engine rotational speed NE (x) obtained in Step 302 is output without modification.

The target engine rotational speed NE calculated in this manner is output to the converter controller 18. As a result, the converter controller 18 adjusts the converter 17 while the motor 19 is operating as a motor, allowing the generator 16 to act as a motor when the motor 19 is operating as a generator, and controls the engine in such a manner that it attains the target engine rotational speed NE. In this process the output nE of the engine rotational speed sensor 8 is used as the feedback amount (Step 309).

Next, a function f with the current engine rotational speed nE output from Step 303, current rotational speed nO of the output shaft, selected position s of the select lever and engine rotational speed nE as variables is used to calculate the target value NO=f (nO, nE, NE, s) of the rotational speed of the output shaft of the motor 19. This target value NO assumes a positive value in forward mode and a negative value in reverse mode. The minimum value NOmin in forward mode and the maximum value NOmax in reverse mode are 0.

The target rotational speed NO of the output shaft calculated in this manner is output to the inverter controller 21 (Step 304). As a result, the motor 19 is controlled via the inverter controller 21 in such a manner that the rotational speed of the motor 19 becomes the abovementioned target rotational speed NO. In this process the output nO of the output shaft rotational speed sensor 9 is used as the feedback amount (Step 309).

If it is here assumed that the vehicle is ascending a slope and stops in the course of the slope, the operator releases the accelerator pedal and applies the brake (depresses the brake pedal) in order to stop the vehicle.

Here, if the vehicle is in forward mode, ie if the selected position s of the select lever is "forward", while the content of the brake control signal B is "off", the output shaft speed nO is lower than the prescribed threshold value NO, the output shaft torque $\tau$O is greater than the prescribed threshold value TO1 and the engine rotational speed nE is lower than the prescribed threshold value NE1, it is judged that the vehicle may be about to stop, and a brake control signal B with the content "on" is generated (Step 305). This is output from the controller 14 to the brake control actuator 15 (Step 308), and the brakes 4, 5 are applied automatically (Step 309). As a result, the operator is able to bring the vehicle to a halt on a slope by means of the simple operation of releasing the accelerator, although in order to decrease the speed of the vehicle the operator must depress the brake pedal until moments before the vehicle comes to a standstill. Moreover, the vehicle can be kept at a standstill thereafter without the need to continue depressing the brake pedal.

In Step 305 above, the reason for insisting that "engine rotational speed nE is lower than the prescribed threshold value NE1" is that in circumstances such as these it is believed that the operator releases the accelerator pedal with the intention of stopping the vehicle, the engine is subject to the load resulting from the uphill slope, and the engine rotational speed is below that of idling. It is therefore preferable for the abovementioned prescribed threshold value NE1 to be below the idling speed.

Meanwhile, if the vehicle is in reverse mode, ie if the selected position s of the select lever is "reverse", the conditions under which the content of the brake control signal changes to "on" are the same as those which apply to forward mode, except for differences resulting from the fact that the rotational speed nO and torque $\tau$O of the output shaft assume negative values (Step 305).

Furthermore, if the vehicle is in neutral mode, ie if the selected position s of the select lever is "neutral", while the content of the brake control signal B is "off" and the absolute value of the output shaft speed nO is lower than the threshold value NO1, a brake control signal B with the content "on" is generated (Step 305). This is output from the controller 14 to the brake control actuator 15 (Step 308), and the brakes 4, 5 are applied automatically (Step 309).

Furthermore, irrespective of the selected position s of the select lever, if a state wherein the absolute value of the target rotational speed NO of the output shaft is smaller than a prescribed threshold value NO2 lasts for more than a prescribed length of time t (sec), a brake control signal B with the content "on" is generated (Step 305). This is output from the controller 14 to the brake control actuator 15 (Step 308), and the brakes 4, 5 are applied automatically (Step 309).

Next, if it is assumed that the vehicle is about to start on a slope, the operator depresses the accelerator pedal in order to start the vehicle.

Then, the load torque TO($\alpha$) on the output shaft when the brakes are not applied is calculated on the basis of the acceleration $\alpha$ as detected by the forward and backward acceleration sensor 11 (Step 306).

Meanwhile, the current torque $\tau$O on the output shaft is obtained as the output of the output shaft torque sensor 10. If these torques TO($\alpha$), $\tau$O are compared, and in forward mode the content of the brake control signal B is "on", while the output shaft torque $\tau$O is greater than the load torque TO($\alpha$) corresponding to the abovementioned acceleration, it is judged the brakes can be released in order for the vehicle to start, whereupon a brake control signal B with the content "off" is generated (Step 307). This is output from the controller 14 to the brake control actuator 15 (Step 308), and the brakes 4, 5 are released automatically (Step 309). As a result, the operator is able to start the vehicle with sufficient tractive force for the gradient of the slope by means of the simple operation of depressing the accelerator.

Meanwhile, if the vehicle is in reverse mode, the conditions under which the content of the brake control signal changes to "off" are the same as those which apply to forward mode, except for differences resulting from the fact that the codes for the torque $\tau$O, TO($\alpha$) are reversed (Step 307).

It is also possible to implement variations on parts of the processes illustrated in FIGS. 4–6, as may be seen for example from FIGS. 7–13.

Figure 7:
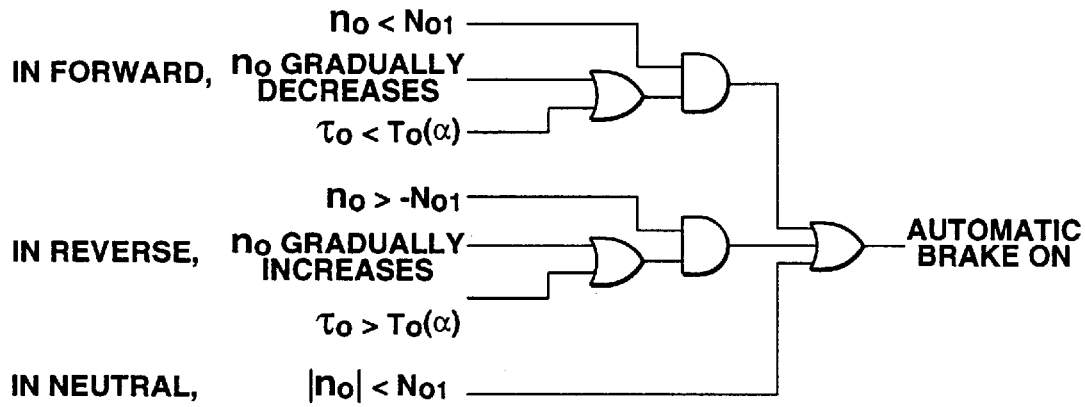
FIG. 7 is a diagram clarifying details of partial modifications to the processing in FIG. 4.

FIG. 7 illustrates a variation on Step 102 in FIG. 4.

That is to say, if the vehicle is in forward mode, ie if the selected position s of the select lever is "forward", while the output shaft speed nO is lower than the prescribed threshold value NO1 and gradually decreasing, or the output shaft speed nO is lower than the prescribed threshold value NO1 and the output shaft torque $\tau$O is smaller than the load torque TO($\alpha$) corresponding to the acceleration, it is judged that the vehicle may be about to stop, and a brake control signal B with the content "on" is generated.

Here, the reason for insisting that "the output shaft torque $\tau$O is smaller than the load torque TO($\alpha$) corresponding to the acceleration" is that in circumstances such as these it is believed that the operator releases the accelerator pedal with the intention of stopping the vehicle, and as a result the output shaft torque $\tau$O is below the torque required to overcome forward and backward acceleration (gravity).

The automatic brake is applied under similar conditions when the vehicle is in reverse mode.

Figure 8:
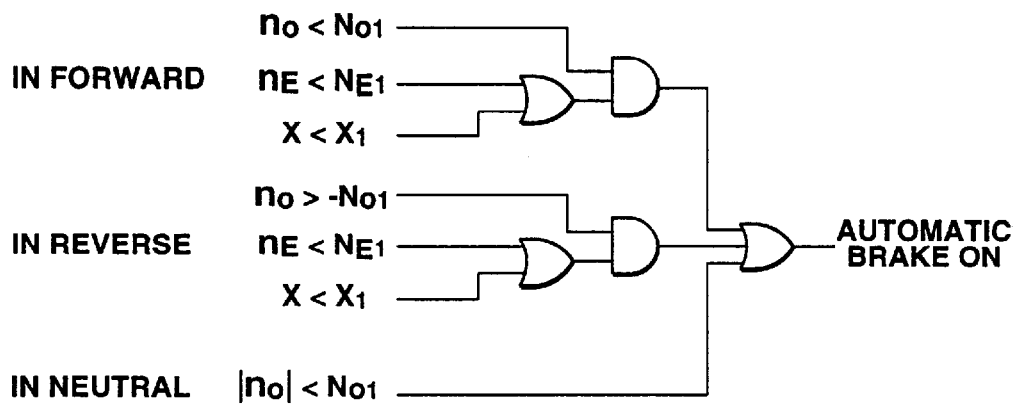
FIG. 8 is a diagram clarifying details of partial modifications to the processing in FIG. 4.

FIG. 8 also illustrates a variation on Step 102 in FIG. 4.

That is to say, if the vehicle is in forward mode, ie if the selected position s of the select lever is "forward", while the output shaft speed nO is lower than the prescribed threshold value NO1 and the engine rotational speed nE is lower than the prescribed value NE1, or the output shaft speed nO is lower than the prescribed threshold value NO1 and the change in the accelerator displacement x is less than the prescribed value X1, it is judged that the vehicle may be about to stop, and a brake control signal B with the content "on" is generated.

Here, the reason for insisting that "the change in the accelerator displacement x is less than the prescribed value X1" is that in circumstances such as these it is believed that the operator releases the accelerator pedal with the intention of stopping the vehicle.

The automatic brake is applied under similar conditions when the vehicle is in reverse mode.

Figure 9:
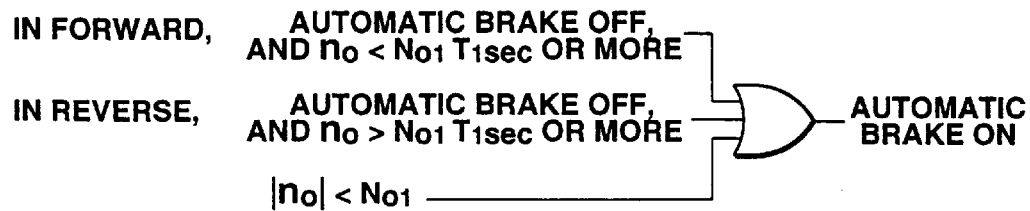
FIG. 9 is a diagram clarifying details of partial modifications to the processing in FIG. 4.

FIG. 9 also illustrates a variation on Step 102 in FIG. 4.

That is to say, if the vehicle is in forward mode, ie if the selected position s of the select lever is "forward", while the content of the brake control signal B is "off", and a state wherein the output shaft speed nO is lower than the prescribed threshold value NO1 lasts for longer than the prescribed time T1, it is judged that the vehicle may be about to stop, and a brake control signal B with the content "on" is generated.

Here, the reason for insisting that "a state wherein the output shaft speed nO is lower than the prescribed threshold value NO1 lasts for longer than the prescribed time T1" is that in circumstances such as these it is believed that the operator releases the accelerator pedal with the intention of stopping the vehicle.

The automatic brake is applied under similar conditions when the vehicle is in reverse mode.

Figure 10:
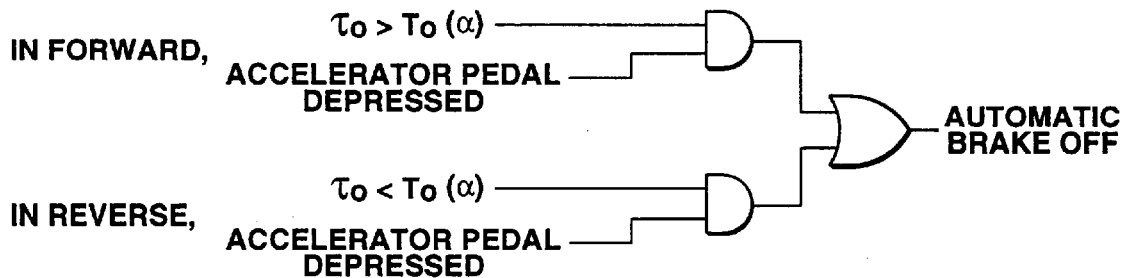
FIG. 10 is a diagram clarifying details of partial modifications to the processing in FIG. 4.

FIG. 10 illustrates a variation on Step 104 in FIG. 4.

That is to say, if in forward mode the output shaft torque $\tau$O is greater than the load torque TO($\alpha$) corresponding to the acceleration, and the accelerator pedal is depressed (the displacement x of the accelerator pedal is greater than zero), it is judged the brakes can be released in order for the vehicle to start, whereupon a brake control signal B with the content "off" is generated.

The automatic brake is released under similar conditions when the vehicle is in reverse mode.

Figure 11:
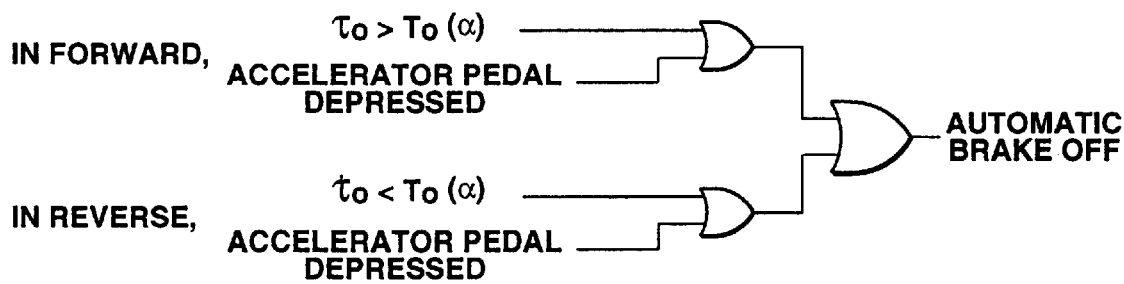
FIG. 11 is a diagram clarifying details of partial modifications to the processing in FIG. 4.

FIG. 11 also illustrates a variation on Step 104 in FIG. 4.

That is to say, if in forward mode the output shaft torque $\tau$O is greater than the load torque TO($\alpha$) corresponding to the acceleration, or the accelerator pedal is depressed (the displacement x of the accelerator pedal is greater than zero), it is judged the brakes can be released in order for the vehicle to start, whereupon a brake control signal B with the content "off" is generated.

The automatic brake is released under similar conditions when the vehicle is in reverse mode.

Figure 12:
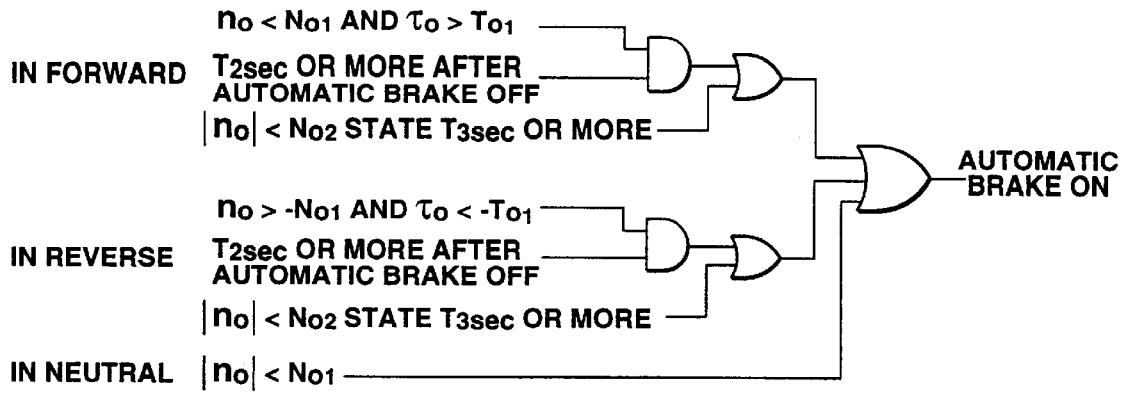
FIG. 12 is a diagram clarifying details of partial modifications to the processing in FIG. 4.

FIG. 12 illustrates a variation on Step 203 in FIG. 5.

That is to say, if the vehicle is in forward mode, ie if the selected position s of the select lever is "forward", while the output shaft speed nO is lower than the prescribed threshold value NO1, the output shaft torque τO is greater than the prescribed threshold value TO1, and longer than the prescribed length of time T2 has elapsed since the content of the brake control signal B changed to off or longer than the prescribed time T3 has elapsed since the absolute value of the output shaft speed nO has been smaller than the prescribed threshold NO2, it is judged that the vehicle may be about to stop, and a brake control signal B with the content "on" is generated.

Here, the reason for insisting that "longer than the prescribed length of time T2 has elapsed since the content of the brake control signal B changed to of" is in order to avoid errors whereby the automatic brake operates when the vehicle starts.

The automatic brake is applied under similar conditions when the vehicle is in reverse mode.

Figure 13:
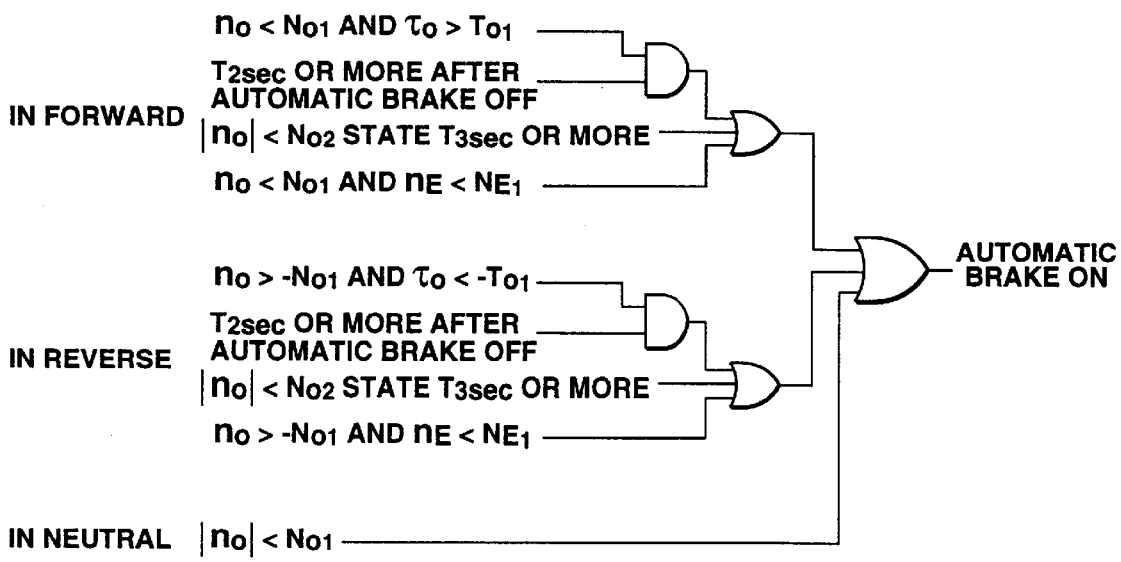
FIG. 13 is a diagram clarifying details of partial modifications to the processing in FIG. 4.

FIG. 13 illustrates a variation on Step 305 in FIG. 6.

Here, if the vehicle is in forward mode, ie if the selected position s of the select lever is "forward", while the output shaft speed nO is lower than the prescribed threshold value NO1, the output shaft torque τO is greater than the prescribed threshold value TO1, and longer than the prescribed length of time T2 has elapsed since the content of the brake control signal B changed to off, longer than the prescribed time T3 has elapsed since the absolute value of the output shaft speed nO has been smaller than the prescribed threshold NO2, or the output shaft speed nO is lower than the prescribed value NO1 and the engine rotational speed nE is lower than the prescribed value nE1, it is judged that the vehicle may be about to stop, and a brake control signal B with the content "on" is generated.

The automatic brake is applied under similar conditions when the vehicle is in reverse mode.

INDUSTRIAL APPLICABILITY

The present invention can be applied not only to wheeled vehicles but also to vehicles which run on crawler tracks.

What is claimed is:

1. An apparatus for controlling brakes of a vehicle, including the vehicle having an accelerator pedal and a brake pedal, and the brakes stopping the vehicle by applying frictional force to wheels of the vehicle, comprising:

travelling speed detecting means for detecting a travelling speed of a vehicle; and control means for controllingly actuating the brakes for stopping the vehicle without operating the brake pedal when the travelling speed detected by the travelling speed detecting means becomes a prescribed threshold value or less by the operation of the accelerator pedal.

2. An apparatus for controlling brakes of a vehicle, including the vehicle having an accelerator pedal and a brake pedal, and the brakes for stopping the vehicle by applying frictional force to wheels of the vehicle, comprising:

travelling speed detecting means for detecting a travelling speed of the vehicle; and control means for controllingly actuating the brakes for stopping the vehicle without operating the brake pedal when a current travelling speed detected by the travelling speed detecting means becomes a prescribed threshold value or less and the current travelling speed becomes smaller than a previously detected travelling speed by the operation of the accelerator pedal.

3. An apparatus for controlling a brake of a vehicle having an accelerator pedal and a brake pedal, comprising:

travelling speed detecting means for detecting a travelling of the vehicle;

acceleration detecting means for detecting an acceleration of the vehicle in a forward and backward direction;

load calculating means for calculating a load on an output shaft when the brake is not applied, on the basis of the acceleration detected by the acceleration detecting means;

load detecting means for detecting the load on the output shaft; and control means for controllingly actuating the brake when the travelling speed detected by the traveling speed detecting means becomes a prescribed threshold value or less and a load detected by the load detecting means becomes smaller than a load calculated by the load calculating means.

4. An apparatus for controlling a brake of a vehicle having an accelerator pedal and a brake pedal, comprising:

travelling speed detecting means for detecting a travelling speed of the vehicle;

depression detecting means for detecting a depressed amount of the accelerator pedal; and control means for controllingly actuating the brake when the travelling speed detected by the travelling speed detecting means becomes a prescribed threshold value or less and the depressed amount of the accelerator pedal detected by the depression amount detecting means becomes a prescribed threshold value or less.

5. An apparatus for controlling a brake of a vehicle having an accelerator pedal and a brake pedal wherein the brake is automatically actuated and thereafter turned off, comprising:

acceleration detecting means for detecting an acceleration of the vehicle in a forward and a backward direction;

load calculating means for calculating, on the basis of the acceleration detected by the acceleration detecting means, a load on an output shaft while the brake is not applied;

load detecting means for detecting the load on the output shaft; and control means for controllingly deactivating the brake when the load detected by the load detecting means becomes greater than the load calculated by the load calculating means.

6. An apparatus for controlling a brake of a vehicle having an accelerator pedal and a brake pedal wherein the brake is automatically actuated and thereafter turned off, comprising:

acceleration detecting means for detecting an acceleration of the vehicle in a forward and backward direction;

load calculating means for calculating, on the basis of the acceleration detected by the acceleration detecting means, a load on an output shaft when the brake is not applied;

load calculating means for calculating, on the basis of the acceleration detected by the acceleration detecting means, a load on an output shaft when the brake is not applied;

load detecting means for detecting the load on the output shaft;

operation detecting means for detecting that the accelerator pedal has been operated; and control means for controllingly deactivating the brake when the load detected by the load detecting means becomes greater than the load calculated by the load calculating means and when the operation detecting means detects that the accelerator pedal has been operated.

7. An apparatus for controlling brake of a motor-driven vehicle having an accelerator pedal and a brake pedal wherein the brake is automatically turned on and off, comprising:

travelling speed detecting means for detecting a travelling speed of the vehicle;

load detecting means for detecting a load on an output shaft of the motor;

timer means for measuring a time since the automatically turned-on-and-off brake was turned off; and control means for controllingly actuating the brake when the travelling speed detected by the travelling speed detecting means becomes a prescribed threshold value or less, the load detected by the load detecting means becomes a prescribed threshold value or more and the time measured by the timer means becomes a prescribed threshold value or more.

* * * * *